(12) United States Patent
Palaniappan et al.

(10) Patent No.: US 10,807,736 B2
(45) Date of Patent: Oct. 20, 2020

(54) WIRELESS LIGHTING SYSTEM FOR AIRCRAFT EVACUATION SYSTEMS

(71) Applicant: Goodrich Corporation, Charlotte, NC (US)

(72) Inventors: Elangovan Palaniappan, Karnataka (IN); Petchi Subramanian, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/385,786

(22) Filed: Apr. 16, 2019

(65) Prior Publication Data

US 2020/0262580 A1 Aug. 20, 2020

(30) Foreign Application Priority Data

Feb. 19, 2019 (IN) .............................. 201911006509

(51) Int. Cl.
| | |
|---|---|
| G08B 21/00 | (2006.01) |
| B64D 47/04 | (2006.01) |
| B64D 25/14 | (2006.01) |
| F21Y 115/10 | (2016.01) |
| F21V 23/00 | (2015.01) |
| F21S 9/02 | (2006.01) |

(52) U.S. Cl.
CPC ............ B64D 47/04 (2013.01); B64D 25/14 (2013.01); *F21S 9/022* (2013.01); *F21V 23/003* (2013.01); *F21Y 2115/10* (2016.08)

(58) Field of Classification Search
CPC ..... B64D 47/04; B64D 25/14; F21Y 2115/10; F21S 9/022; F21V 23/003

USPC ......................................................... 340/945
See application file for complete search history.

(56) References Cited

U.S. PATENT DOCUMENTS

| | | | | | |
|---|---|---|---|---|---|
| 3,621,383 | A | * | 11/1971 | Rush ...................... | B64D 25/14 |
| | | | | | 324/414 |
| 4,846,422 | A | * | 7/1989 | Fisher .................... | B64D 25/14 |
| | | | | | 244/137.2 |
| 5,444,604 | A | * | 8/1995 | Hiner ....................... | B60Q 7/02 |
| | | | | | 362/310 |
| 5,586,615 | A | * | 12/1996 | Hammer .................. | A62B 1/20 |
| | | | | | 182/48 |
| 6,600,274 | B1 | * | 7/2003 | Hughes ................ | H05B 45/395 |
| | | | | | 315/291 |

(Continued)

*Primary Examiner* — Zhen Y Wu
(74) *Attorney, Agent, or Firm* — Cantor Colburn LLP

(57) ABSTRACT

A wireless lighting system for an aircraft evacuation system. The wireless lighting system includes a wireless controller disposed in the aircraft having at least a transmitter configured to communicate an activation under an aircraft evacuation event when the aircraft evacuation system is deployed, and a first light source disposed on the aircraft evacuation system, the first light source configured to provide illumination to the aircraft evacuation system. The wireless lighting system also includes a first energy storage device disposed on the aircraft evacuation system and a first wireless receiver disposed on the aircraft evacuation system and configured to receive the activation signal from the wireless controller. The first wireless receiver is operably connected to the first energy storage device and the first light source and configured to activate the first light source based on the activation signal.

12 Claims, 2 Drawing Sheets

(56) References Cited

U.S. PATENT DOCUMENTS

| | | | |
|---|---|---|---|
| 7,018,079 B1* | 3/2006 | Franco-Vila | A62B 1/20 |
| | | | 362/470 |
| 7,369,062 B2* | 5/2008 | Stokes | G05B 15/02 |
| | | | 340/945 |
| 9,655,186 B2* | 5/2017 | Hessling Von Heimendahl | |
| | | | B64D 11/00 |
| 2004/0104307 A1* | 6/2004 | Stokes | B64D 25/14 |
| | | | 244/137.2 |
| 2005/0104740 A1* | 5/2005 | Stokes | H05B 47/19 |
| | | | 340/815.45 |
| 2005/0115794 A1* | 6/2005 | Zonneveld | A62B 3/00 |
| | | | 193/5 |
| 2005/0141226 A1* | 6/2005 | Wisch | B64D 11/00 |
| | | | 362/470 |
| 2006/0111793 A1* | 5/2006 | Stokes | G05B 15/02 |
| | | | 700/3 |
| 2014/0262614 A1* | 9/2014 | Rushin | B64D 25/14 |
| | | | 182/48 |
| 2015/0091438 A1* | 4/2015 | Hessling Von Heimendahl | |
| | | | H02J 9/065 |
| | | | 315/77 |
| 2015/0097083 A1* | 4/2015 | Fellmann | B64D 25/14 |
| | | | 244/137.2 |
| 2015/0108895 A1* | 4/2015 | Trinschek | B60Q 3/47 |
| | | | 315/86 |
| 2016/0171848 A1* | 6/2016 | Kohlmeier-Beckmann | |
| | | | B64D 47/02 |
| | | | 340/945 |
| 2017/0050744 A1* | 2/2017 | Bredemeier | B64D 45/0015 |
| 2017/0113813 A1* | 4/2017 | Heuer | G01C 9/005 |
| 2018/0220506 A1* | 8/2018 | Sadwick | F21V 17/101 |
| 2019/0150248 A1* | 5/2019 | Leegate | H02J 9/02 |
| | | | 307/9.1 |

\* cited by examiner ical method of quickly evacuating a large number of passengers from an aircraft is to provide multiple emergency exits each of which is equipped with an inflatable emergency evacuation slide. Since not all emergencies occur during daylight or in well-lit areas, emergency evacuation slides are often equipped with lighting systems to illuminate at least a portion of the evacuation slide when it is deployed.
WIRELESS LIGHTING SYSTEM FOR AIRCRAFT EVACUATION SYSTEMS

CROSS-REFERENCE TO RELATED APPLICATIONS

This application claims the benefit of Indian Application No. 201911006509 filed Feb. 19, 2019, which is incorporated herein by reference in its entirety.

BACKGROUND

Exemplary embodiments pertain to the art of aircraft evacuation systems and more particularly for wireless lighting system for an aircraft evacuation slide.

The requirement for reliably evacuating airline passengers in the event of an emergency is well known. A conventional method of quickly evacuating a large number of passengers from an aircraft is to provide multiple emergency exits each of which is equipped with an inflatable emergency evacuation slide. Since not all emergencies occur during daylight or in well-lit areas, emergency evacuation slides are often equipped with lighting systems to illuminate at least a portion of the evacuation slide when it is deployed.

An evacuation slide is required on all commercial (passenger carrying) aircraft where the door sill height is such that, in the event of an evacuation, passengers would be unable to step down from the door uninjured (Federal Aviation Administration requires slides on all aircraft doors where the floor is 6 feet (1.8 m) or more above the ground). Per Federal Regulations, emergency slide lights must provide illumination of not less than 0.03 foot-candle (measured normal to the direction of incident light) at the ground and of the erected assist means where an evacuee would normally make first contact with the ground, with the airplane in each of the attitudes corresponding to the collapse of one or more legs of the landing gear. The energy supply to each emergency lighting unit must provide the required level of illumination for at least 10 minutes at the critical ambient conditions after emergency landing.

Emergency lighting system for escape slides for vehicles, primarily aircraft, typically include lighting harnesses with a plurality of electric lighting units, a battery pack, switch mechanism automatically operated to energize lights upon deployment of slide. The lighting harnesses may be prefabricated in one standard size adaptable for application to slides of widely varying sizes and configurations. The emergency slide is normally carried in the aircraft in tightly folded condition with battery pack and lighting units inaccessible. Unfortunately, because of such a packing configuration, the wiring installation in the slide encounters numerous fabrication and reliability challenges. In addition, as a result of the compact packaging damage to wiring and components is possible. Moreover, because of the packing forces and configuration, the wiring harnesses and some components for controlling the lighting under deployment conditions may be damaged Testing the device to ensure its reliability is difficult with access to the slide and its components being limited. To further exacerbate the concerns, a deployed slide with degraded/inadequate lighting as a result faults is unavailable for use during an evacuation. As such, an improved scheme for lighting the evacuation slide is needed.

BRIEF DESCRIPTION

Disclosed herein in an embodiment is a wireless lighting system for an aircraft evacuation system. The wireless lighting system includes a wireless controller disposed in the aircraft having at least a transmitter configured to communicate an activation under an aircraft evacuation event when the aircraft evacuation system is deployed, and a first light source disposed on the aircraft evacuation system, the first light source configured to provide illumination to the aircraft evacuation. The wireless lighting system also includes a first energy storage device disposed on the aircraft evacuation system and a first wireless receiver disposed on the aircraft evacuation system and configured to receive the activation signal from the wireless controller. The first wireless receiver is operably connected to the first energy storage device and the first light source and configured to activate the first light source based on the activation signal.

In addition to one or more of the features described above, or as an alternative to any of the foregoing embodiments, further embodiments of the system may include that the wireless controller is powered by an aircraft emergency power system.

In addition to one or more of the features described above, or as an alternative to any of the foregoing embodiments, further embodiments of the system may include that the first light source is a more energy efficient than incandescent light bulbs.

In addition to one or more of the features described above, or as an alternative to any of the foregoing embodiments, further embodiments of the system may include that the first light source is a light emitting diode (LED).

In addition to one or more of the features described above, or as an alternative to any of the foregoing embodiments, further embodiments of the system may include that the first energy storage device is at least one of a battery, an energy harvesting storage material, an ultra-capacitor.

In addition to one or more of the features described above, or as an alternative to any of the foregoing embodiments, further embodiments of the system may include that the battery is at least one of a Li-Ion, Alkaline, Ni-CD, NiMH, solid state SMD, lead acid, sealed, dry cell, and wet cell.

In addition to one or more of the features described above, or as an alternative to any of the foregoing embodiments, further embodiments of the system may include that the wireless controller communicates with the first wireless receiver with at least one of optical communication and radio frequency (RF) communication.

In addition to one or more of the features described above, or as an alternative to any of the foregoing embodiments, further embodiments of the system may include that the optical communication is based on infrared (IR) communication.

In addition to one or more of the features described above, or as an alternative to any of the foregoing embodiments, further embodiments of the system may include that the (RF) communication is based on at least one of WiFi, Bluetooth, and NFC.

In addition to one or more of the features described above, or as an alternative to any of the foregoing embodiments, further embodiments of the system may include that the wireless controller communicates with the first wireless receiver with simplex communication.

In addition to one or more of the features described above, or as an alternative to any of the foregoing embodiments, further embodiments of the system may include that the wireless controller is a transceiver and the first wireless receiver is a transceiver and the wireless controller communicates with the first wireless receiver with duplex communication.

In addition to one or more of the features described above, or as an alternative to any of the foregoing embodiments, further embodiments of the system may include that at least two of the first light source, the first energy storage device, and the first wireless receiver are integrated into a single package and modular.

In addition to one or more of the features described above, or as an alternative to any of the foregoing embodiments, further embodiments of the system may include a second light source disposed on the aircraft evacuation system, the second light source configured to provide illumination to the aircraft evacuation, a second energy storage device disposed on the aircraft evacuation system, and a second wireless receiver disposed on the aircraft evacuation system and configured to receive the activation signal from the wireless controller, the second wireless receiver operably connected to the second energy storage device and the second light source and configured to activate the second light source based on the activation signal.

In addition to one or more of the features described above, or as an alternative to any of the foregoing embodiments, further embodiments of the system may include that at least one of the second light source, the second energy storage device, and the second wireless receiver are operably independent from the first light source, the first energy storage device, and the first wireless receiver.

In addition to one or more of the features described above, or as an alternative to any of the foregoing embodiments, further embodiments of the system may include a third light source disposed on the aircraft evacuation system, the third light source configured to provide illumination to the aircraft evacuation system and a wired receiver disposed on the aircraft evacuation system and operably connected to the first wireless receiver, the wired receiver configured to activate the third light source based on another activation signal provided by the first wireless receiver.

In addition to one or more of the features described above, or as an alternative to any of the foregoing embodiments, further embodiments of the system may include that the aircraft evacuation system is an evacuation slide disposed at an opening in an aircraft.

In addition to one or more of the features described above, or as an alternative to any of the foregoing embodiments, further embodiments of the system may include that the evacuation system includes and evacuation slide made of flexible gastight material, and is prepared for positioning within a vehicle by being placed in tightly folded deflated condition, and is provided with inflating means to deploy said slide into inflated condition when deployed.

Also described herein in an embodiment is a method of illuminating an aircraft evacuation system for an aircraft. The method including disposing a wireless controller in the aircraft, the wireless controller having at least a transmitter, communicating an activation signal under an aircraft evacuation event when the aircraft evacuation system is deployed, disposing a first light source on the aircraft evacuation system, the first light source configured to provide illumination to the aircraft evacuation system, and disposing a first energy storage device on the aircraft evacuation system. The method also includes operably connecting the first wireless receiver to the first energy storage device and the first light source, receiving the activation signal from the wireless controller with a first wireless receiver disposed on the aircraft evacuation system, and activating the first light source with the first wireless receiver based on the activation signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
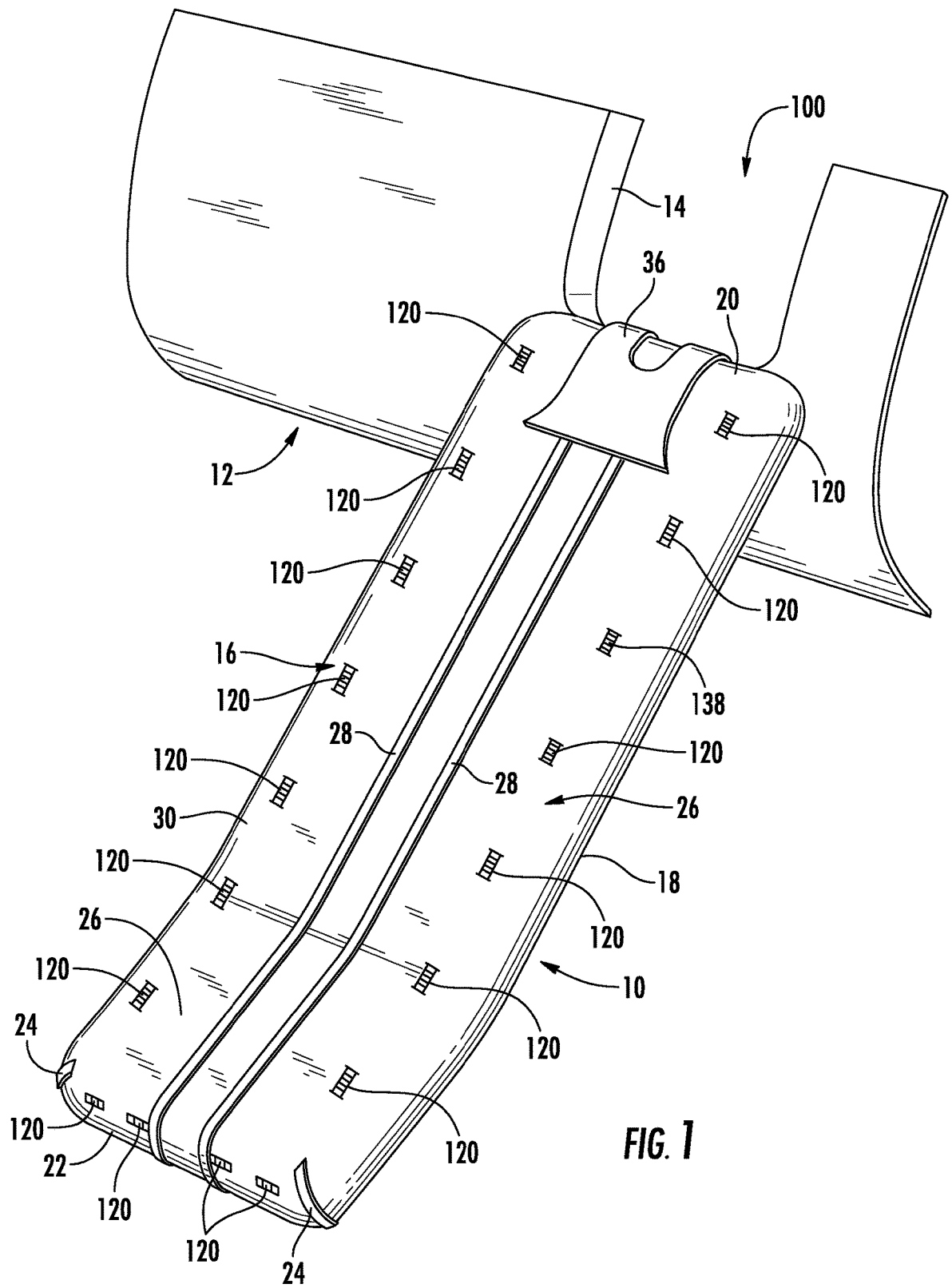
FIG. 1 depicts an example of an evacuation slide on an aircraft.

FIG. 1 depicts an evacuation slide 10 shown in a deployed condition ready for use in which occupants of an aircraft 12 escape through an opening 14. The details of construction of the slide 10 or the manner in which it is secured to the aircraft for emergency use with the opening 14 and the associated door or window (not shown) are conventional and not described further herein. The escape slide 10 as shown in FIG. 1 is illustrated in simplified and diagrammatic fashion and it is intended only to suggest a construction typical of the many types of slides, stairs and the like to which the emergency lighting system of the described embodiments may be secured. Such typical evacuation slide 10 may be made up of one or more generally tubular inflatable bolsters of gastight material, such as rubber or plastic coated fabric, mitered together at the corners to form a generally rectangular structure when inflated. Longitudinal bolsters 16 and 18 are mitered to transverse bolsters 20 and 22 at corners indicated generally at 24. The upper surface 30 of the slide 10 comprises a sheet of fabric 26 which is firmly secured to the four bolsters 16, 18, 20, 22. The fabric 26 thus serves as the surface upon which persons slide when evacuating an aircraft 12. Usually the surface fabric 26 is provided with grounding strips 28 of electrically conductive material on or integral with the fabric 26, which extend around the lower ends of the slide so as to come into contact with the ground upon deployment of the slide 10. A scuff strip 30 also rests upon the ground to protect the deployed slide from damage. Static electrical charges built up on the body of the slide 10 or the bodies of the users of the slide 10 will be discharged to the ground through the grounding strips 28 reducing the discomfort of electrical shock and also reducing the risk of ignition of any ambient flammable liquids or gases.

The lower surfaces of the longitudinal bolsters 16 also may be cross-connected by web straps (not shown) spaced along the length of the slide 10 to further stabilize it when in deployed condition. An apron 36 may be employed and is made of flexible material and frequently serves the dual purpose of attachment to the aircraft and of providing a surface which gives a reassuring continuity to the surface of the slide 10 and the interior of the aircraft 12. It will be understood that the length and width of the slides 10 will vary greatly depending upon the aircraft 12 for which they are designed and also depending upon the particular exit with which they are to cooperate. In a general sense, for use with commercial aircraft in use, the slides may vary in length from a minimum of about 140" to a maximum of about 270". Obviously, as larger aircraft or aircraft of different configurations are brought into use the range of lengths of the slides may be extended at both ends.

Slides 10 of the types here involved are normally carried in the aircraft or other vehicle in deflated, tightly folded condition adjacent the door or other opening with which they are intended for use in an emergency. A typical configuration of a folded slide requires the evacuation of enclosed air and it is folded up by trained personnel in a specific manner, an operation which, as noted above, takes a large number of man-hours to complete. The folded slide 10 is held in such condition by various types of breakaway fastening devices including, in some cases a plurality of separable fasteners. A lanyard (not shown) is usually provided for initiation of inflation and deployment of the slide when desired. Generally, a cylinder of highly compressed gas (not shown) is enveloped in the upper portions of the folds of the packed slide 10. The assembly may also include a pressure gauge in visible position for routine checking by inspectors. The assembly is connected by a flexible tube to the interior of the slide 10, an aspirator is associated with a gas supply tube as to admit air by injection when the highly compressed gas from cylinder enters and expands into the slide. In a typical installation the cylinder may contain nitrogen under a pressure of about 3,000 psi. An aspirator system, may be employed to facilitate the fully inflating the deployed slide such that air and nitrogen fill the inflatable bolsters 16, 18, 20, 24 and the like. Suitable relief valves are usually provided, not shown herein, to protect the structure from over inflation. During inflation the various breakaway devices mentioned above will release in proper sequence to ensure inflation of all internal regions of the slide and thus the assumption of proper deployed shape as shown in FIG. 1.

Figure 2:
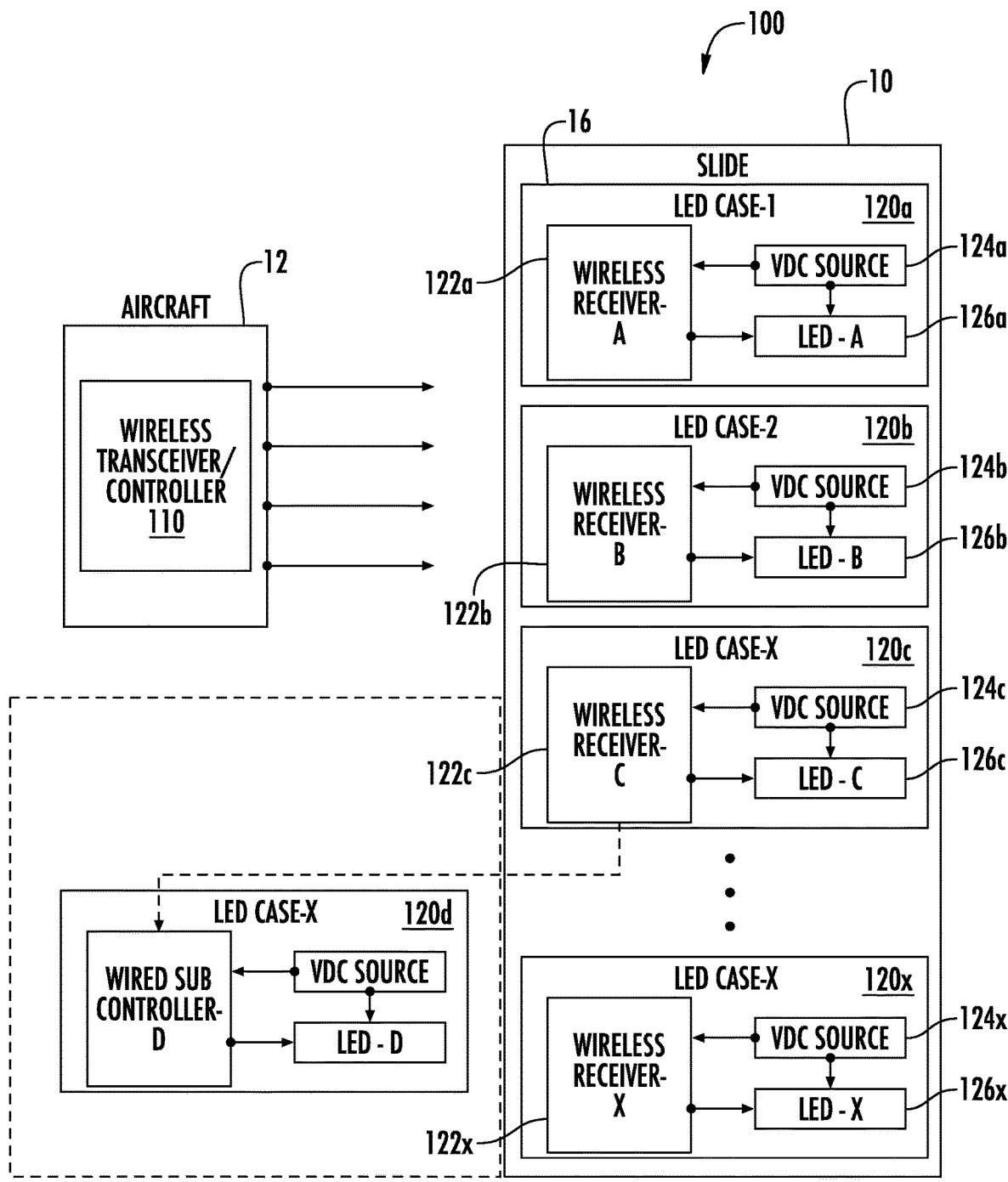
FIG. 2 is a block diagram of a lighting system in accordance with an embodiment.

Turning now to FIG. 2 as well, slide 10 also includes a wireless lighting system shown generally as 100. Lighting system 100 includes, but is not limited to an aircraft based wireless transmitter 110 and a plurality of lighting units or modules shown generally as 120 and specifically as 120a, 120b, 120c . . . 120x disposed on the slide 10 and distributed as needed along its length and width to provide sufficient lighting with requirements and regulations on the slide 10. In an embodiment, the wireless transmitter 110 is configured to transmit an actuation signal to each of the lighting modules 120 to activate the lighting modules. For example, when an evacuation situation arises and the door is opened, the activation lanyard (described herein) pulls a trigger and opens the gas cylinder to activate and deploy the slide 10. In addition, such actuation also enables connecting an aircraft based (emergency) power supply with the wireless transmitter 110. In an embodiment conventional wireless transmitters may be employed for simplicity and ease of application and lower cost. With the transmitter 110 enabled, a transmitter circuit transmits an activation signal. While the described embodiments are directed to the wireless transmitter 110 employing unidirectional simplex transmissions, it should be appreciated that other and more sophisticated forms of communication are possible. For example, in an embodiment, the wireless transmitter 110 may be a transceiver such that duplex communication with the lighting modules 120 is possible. The wireless communication between the wireless transmitter and the receiver 122 can be radio frequency based (RF), optical, e.g., infrared (IR) and the like. Example wireless communication techniques may include IR, Bluetooth, WiFi, NFC, and the like. Each communication technique has its advantages and detraction based on cost, range interference and the like. For example, RF transmission is stronger and more reliable than Infrared (IR) transmission, while infrared is not susceptible to RF interference. RF signals can generally travel longer distances than IR and NFC signals. Only line of sight communication is possible through IR signals whereas RF signals can be transmitted even when there are obstacles. IR signals can interfere with one another IR sources, but generally, IR signals and signals on one frequency band in RF will not get interfered by other RF signals.

Each lighting unit 120 may include a wireless receiver/transceiver/controller referred to generally as 122 hereinafter referred to as receiver 122 and more specifically as 122a, 122b, 122c, . . . 122x operably coupled to an energy storage device referred to generally as 124 and a light source referred to generally as 126. In embodiment the energy storage device 124, and more specifically 124a, 124b, 124c . . . 124x is a battery, but other energy sources and storage devices are possible including capacitors, ultracapacitors, energy harvesting storage materials, and the like. In an embodiment, a Li-Ion battery is employed for its longevity, however other types of batteries are possible including, but not limited to NiCd, NiMH, Alkaline, solid state SMD, dry cell, sealed lead acid, and the like. In embodiment, the light source 126, or more specifically 126a, 126b, 126c . . . 126x is an energy efficient LED or LED array configuration or other energy efficient light source with sufficient illumination capability that when arranged on the slide 10 satisfy the illumination regulations for the application. In an embodiment, the light source is any illumination source more efficient than incandescent bulbs. In an embodiment, the wireless receiver 122, energy storage device 124 and light source 126 are preferably integrated into a single modular package for ease of installation in the slide 10.

In view of the exacting requirements for proper folding and deployment of the slide 10 and in view of the demand for minimum space occupancy when the slide 10 is folded it will be apparent that an emergency lighting system 100 must be so designed and installed as not to interfere with or further complicate the folding and deploying operations and it must not significantly increase the size of the folded slide 10.

Maximum benefit from the lighting system incorporating the preferred components described above or components of equivalent or, when developed, of superior quality, and convenient testing provisions herein disclosed will be realized when energy storage device(s) 124 e.g., battery cells having long shelf-life are employed. In an embodiment, energy storage devices 124, e.g. batteries with a multi-year shelf life makes it possible, in the absence of unexpected damage, deterioration or failures of the various components, to leave the slides 10 equipped with such systems in service in packed and tightly folded condition for multi-year periods (typically four years at a time) throughout the service lives of the slides 10. Since it is customary in many instances at the present time to test all slides by deployment and repacking at selected intervals the installation of the lighting system 100 of the described embodiments will not make deployment and repacking necessary at intervals more frequent that those already established and may in fact reduce the inspection intervals.

The shape and location of the energy storage device(s) 124 and the electrical and mechanical relationship thereof with receiver/controller(s) 122 and light source(s) 126 as well as the specific design of receiver/controller(s) 122 may be varied to meet specific desires or requirements as needed. For example, when the folding pattern for a particular evacuation slide 10 design makes it preferable to configure or locate one or more lighting module(s) or energy storage device(s) 124 of suitable shape and configuration other that employed for others in the lighting system 100. It should also be appreciated that in some embodiments some lighting modules 120 may include a wireless connection to a controller 110, while some may be wired as a wired subcontroller 120d to another wireless controller 120 e.g., 120c to facilitate ease of connection and configuration. Though such a configuration may limit flexibility and reliability of a fully wireless configuration, there may be instances where it may be advantageous based on cost, configuration and the like. Moreover, in some instances a singly wireless receiver/controller 122 and energy storage device may be employed to control and power more than one light source 126.

Advantageously the described embodiments facilitate the fabrication of an evacuation slide 10 with improved reliability by eliminating many of the wires of conventional configurations. This avoids the risk of damage to the wiring typically resultant from the folding and packing of the slide 10. Another feature of the described embodiments is that by making each of the lighting modules 120 independent, and having their own energy storage device and integral receiver/controller 122, the constant current module and wiring of existing designs is eliminated. Advantageously this approach provides for a significant reliability improvement by eliminating a potential single point failure component in legacy systems.

Another advantage of the described embodiments is that a wireless configuration eliminates the bonding or taping of the wires to the slide of existing designs. Furthermore, the described embodiments maintain each of the lighting modules 120 independent of the others as a result, failure or a depleted energy storage device 124 in one device does not impact another lighting module, whereas with conventional designs a wire cut would result in the loss of operation of all lights connected in the circuit supplied by the cut wire. Yet another improved technical feature of the described embodiments is that the wireless lighting system 100 with independent lighting modules means that select lighting modules may be configured to operate differently than other modules if desired. For example dimming, brightness, flashing, strobing, coordinated flashing, even color, and the like. As a result of the independent nature of the wireless lighting modules 120 of the described embodiments, reliability and flexibility of the overall lighting system 100 for the slide 10 is improved. Furthermore, depending on the lighting module 120 and the light source 126 other alternatives are possible.

For example, in an embodiment the light source 126 may configured as multi-color LEDs (Red, Green, Blue) (RGB LEDs). By using such a configuration, make different light sources 126 in various lighting modules 120 along the length of the slide 10 can be configured to glow in different colors. For example: in one embodiment, from the top of the slide as attached to the aircraft 12, a first number of light sources 126 e.g., (LEDs) may be configured to glow in a first color, e.g., Green; then further on the slide 12, a second number of light sources 126, e.g., LEDs may be configured to glow in a second color, e.g., blue; and finally, perhaps a the base of the slide 10, some other light sources 126 may be configured to glow in a third color, e.g., red.

Currently only white color light sources are used in aircraft slides. One advantage of the described embodiments is that the lighting modules 120 can be configured in a variety of configurations such as alternating a number of light sources 126 e.g., LEDs, such as 1st, 3rd, 5th . . . ) first 5 minutes and then even numbered light sources 126 (such as 2nd, 4th, 6th . . . ) will glow later. Furthermore the light sources could be flashing along the length of the slide indicating and illustrating the trajectory path on the slide all while conserving energy to minimize the required size of the energy storage device 124.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft evacuation system of an aircraft comprising:
an evacuation slide disposed at an opening in the aircraft, the evacuation slide made of flexible gastight material, and is prepared for positioning within the aircraft by being placed in tightly folded deflated condition;
a wireless lighting system that comprises:
a wireless controller disposed in the aircraft having at least a transmitter configured to communicate an activation signal under an aircraft evacuation event when the aircraft evacuation slide is deployed;
wireless lighting modules disposed on the aircraft evacuation slide and spaced apart from each other, wherein the wireless lighting modules operate independently of each other, each of wireless lighting modules including:
a light source configured to provide illumination to the aircraft evacuation slide;
an energy storage device, wherein the energy storage device is a battery;
a wireless receiver configured to receive the activation signal from the wireless controller, the wireless receiver operably connected to the energy storage device and the light source and configured to activate the light source based on the activation signal;
a wired lighting module disposed on the aircraft evacuation slide and spaced apart from the wireless lighting modules, the wired lighting module including:
another light source disposed on the aircraft evacuation slide, the another light source configured to provide illumination to the aircraft evacuation slide;

a wired receiver disposed on the aircraft evacuation slide and operably connected to one of the wireless lighting modules,
the wired receiver configured to activate the another light source based on another activation signal provided by the one of the wireless lighting modules.

2. The system of claim 1, wherein the wireless controller is powered by an aircraft emergency power system.

3. The system of claim 1, wherein each light source is more energy efficient than an incandescent light bulb.

4. The system of claim 1, wherein each light source is a light emitting diode (LED).

5. The system of claim 1, wherein
each battery is at least one of a Lithium-ion (Li-Ion), Alkaline, Nickel-Cadmium (Ni-CD), Nickel-Metal Hydride (NiMH), solid state Surface Mounted (SMD), lead acid, sealed, dry cell, and wet cell.

6. The system of claim 1, wherein
the wireless controller communicates with each wireless receiver with at least one of optical communication and radio frequency (RF) communication.

7. The system of claim 6, wherein the optical communication is based on infrared (IR) communication.

8. The system of claim 6, wherein the (RF) communication is based on at least one of WiFi, Bluetooth, and Near-Field Communications (NFC).

9. The system of claim 1, wherein
the wireless controller communicates with each wireless receiver with simplex communication.

10. The system of claim 1, wherein
the wireless controller is a transceiver and each wireless receiver is a transceiver and the wireless controller communicates with each wireless receiver with duplex communication.

11. The wireless lighting system of claim 1, wherein
the evacuation slide is provided with inflating means to deploy said slide into inflated condition when deployed.

12. A method of illuminating an aircraft evacuation slide of an aircraft evacuation system for an aircraft, the method comprising:
disposing a wireless controller in the aircraft, the wireless controller having at least a transmitter;
communicating an activation signal under an aircraft evacuation event when the aircraft evacuation slide is deployed, wherein the evacuation slide is disposed at an opening in the aircraft and made of flexible gastight material, and is prepared for positioning within the aircraft by being placed in tightly folded deflated condition;
disposing wireless lighting modules and a wired lighting module on the aircraft evacuation slide, the wireless lighting modules and the wired lighting module configured to provide illumination to the aircraft evacuation slide, wherein:
the wireless lighting modules are spaced apart from each other, wherein the wireless lighting modules operate independently of each other, each of wireless lighting modules including:
a light source configured to provide illumination to the aircraft evacuation slide;
an energy storage device, wherein the energy storage device is a battery;
a wireless receiver configured to receive the activation signal from the wireless controller, the wireless receiver operably connected to the energy storage device and the light source and configured to activate the light source based on the activation signal;
the wired lighting module is spaced apart from the wireless lighting modules, the wired lighting module including:
another light source disposed on the aircraft evacuation slide, the another light source configured to provide illumination to the aircraft evacuation slide;
a wired receiver disposed on the aircraft evacuation slide and operably connected to one of the wireless lighting modules,
the wired receiver configured to activate the another light source based on another activation signal provided by the one of the wireless lighting modules;
receiving the activation signal from the wireless controller with the wireless lighting module;
activating the wireless lighting modules based on the activation signal; and
activating the wired lighting module based on another activation signal provided by the one of the wireless lighting modules.

* * * * *